United States Patent [19]

Rockenfeller et al.

[11] Patent Number: 4,906,149

[45] Date of Patent: Mar. 6, 1990

[54] WALL PLUG ANCHOR ASSEMBLY FOR MOUNTING IN A PREFORMED HOLE

[75] Inventors: Gottfried Rockenfeller; Wolfgang Rockenfeller, both of Hilchenbach, Fed. Rep. of Germany

[73] Assignee: Rockenfeller KG, Hilchenbach, Fed. Rep. of Germany

[21] Appl. No.: 278,019

[22] Filed: Nov. 30, 1988

[30] Foreign Application Priority Data

May 17, 1988 [DE] Fed. Rep. of Germany ....... 3816662

[51] Int. Cl.$^4$ ..................... F16B 13/04; F16B 13/06; F16B 15/00
[52] U.S. Cl. ........................................ 411/54; 411/79; 411/357; 411/448; 411/501
[58] Field of Search ................... 411/21, 22, 40–42, 411/54, 79, 80, 357, 358, 359, 447, 448, 922

[56] References Cited

U.S. PATENT DOCUMENTS

| | | | |
|---|---|---|---|
| 1,428,111 | 9/1922 | Molesworth | 411/359 |
| 1,716,888 | 6/1929 | Griffith | 411/448 |
| 2,314,445 | 3/1943 | Du Vall | 411/44 |
| 3,030,850 | 4/1962 | Minor et al. | 411/501 |
| 4,767,248 | 8/1988 | Pratt | 411/501 |

FOREIGN PATENT DOCUMENTS 18680 of 1899 United Kingdom ............... 411/357

Primary Examiner—Neill R. Wilson
Attorney, Agent, or Firm—Herbert Dubno

[57] ABSTRACT

The wall plug anchor assembly is applicable to heavy-duty and reinforced concrete and the like, of a construction component such as a wall and the like environments. The wall plug anchor assembly includes a metallic sleeve having a head of a respectively greater diameter than the sleeve body, of a metallic material, such as a plastically deformable steel of German steel quality ST 34 or ST 37, and wedge means for permanently modifying the sleeve at a location remote from the crown end thereof, particularly to permanently modify the transverse cross-sectional dimension of the sleeve, for example to enlarge the diameter by plastic deformation of the sleeve walls.

11 Claims, 2 Drawing Sheets

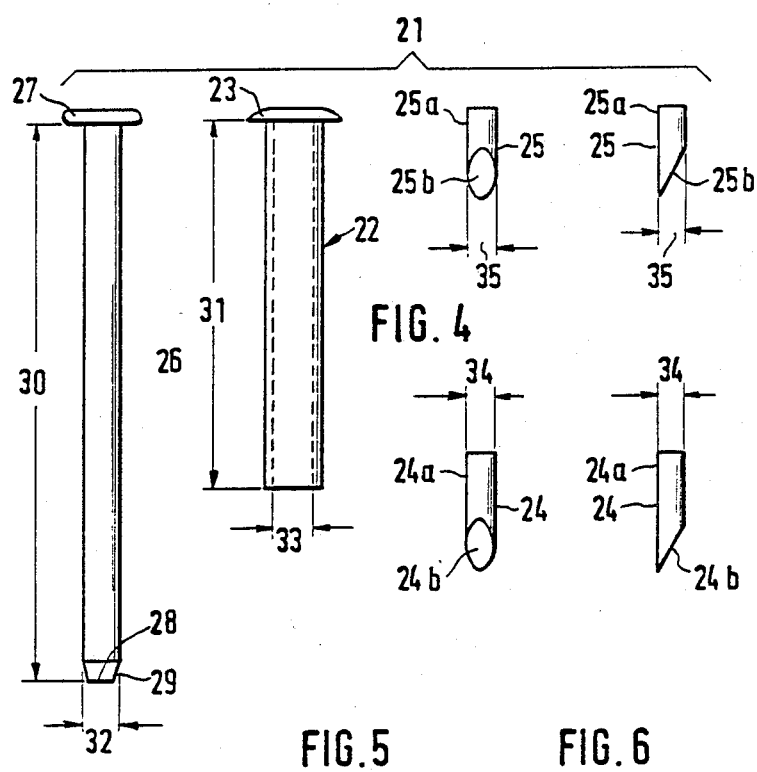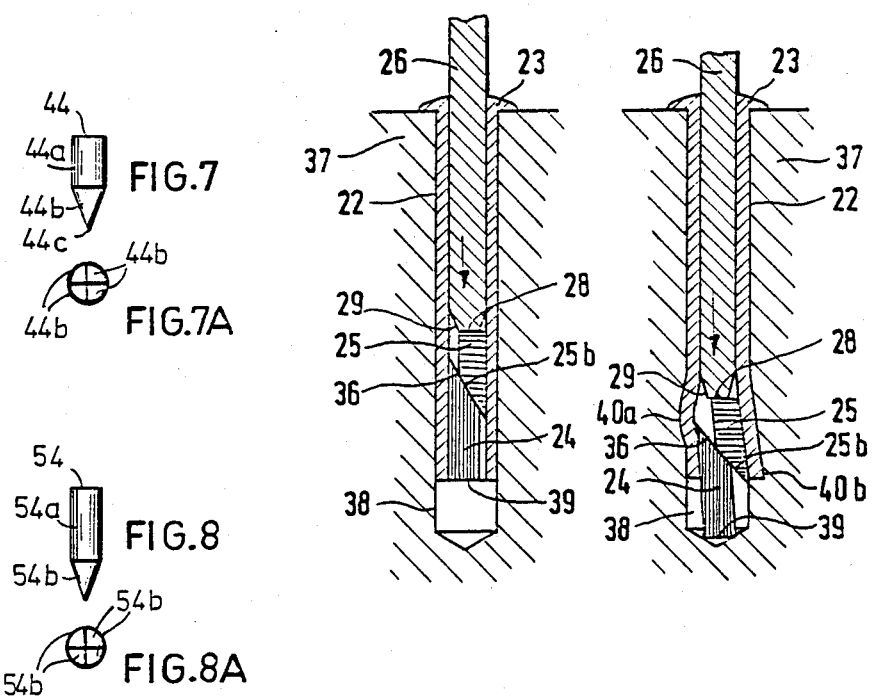

WALL PLUG ANCHOR ASSEMBLY FOR MOUNTING IN A PREFORMED HOLE

CROSS-REFERENCE TO RELATED APPLICATIONS

This application is related to our concurrently filed copending application Ser. No. 07/281,834 filed 8 Dec. 1988. Reference may be had to the following prior contributions in this field:

U.S. Pat. No. 4,572,720 issued 25 Feb. 1986;
U.S. Pat. No. 4,706,345 issued 17 Nov. 1987.
U.S. Pat. No. 4,718,802 issued 12 Jan. 1988; and
U.S. Pat. No. 4,727,694 issued 1 Mar. 1988.

FIELD OF THE INVENTION

Our present invention relates to a tubular dowel, fastener, or like wall plug anchor assembly. The wall plug anchor assembly is especially intended to be mounted and secured for achoring in a bore hole pre-drilled in concrete, such as of a wall or a construction element or component, of heavy-duty or reinforced concrete and like compositions.

More particularly, this invention relates to a wall plug anchor assembly comprising a sleeve of metallic material, such as a steel having good plastic formability and ductility, for example, stainless steel and as is exhibited by the German steels ST 34 and ST 37. The sleeve has a head or crown end or portion with a diameter which is greater than the diameter of the sleeve body. The assembly also includes means which serve to permanently modify the sleeve at a point remote from the crown end thereof, particularly as for its cross-sectional configuration or dimension.

It is especially contemplated by the invention to permanently modify the transverse cross-sectional dimension of the sleeve, by introduction of a bulge or like anchoring formation at the sleeve wall.

BACKGROUND OF THE INVENTION

German Laid-Open Patent Publication No. 36 03 134 describes a wall plug anchor assembly for light-duty concrete and like concrete compositions. This known wall plug anchor assembly includes a sleeve body made of a thin-walled piece of pipe or tubing and its head end has a conically or outwardly widened portion.

This prior-art wall plug anchor assembly is particularly suited to be driven into bricks, blocks, and plates. These components might be made of gas-expanded and light-duty concrete, foam-type concrete, or clay and/or silicate-type concrete.

Into the thin-wall prior-art wall plug anchor assembly are cut at least two diametrically arranged slots, extending from the tail or foot end thereof. A spreading body can be introduced, from the foot end of the sleeve, into the sleeve, and this spreading body serves to spread or flare the legs which remain between the slots, so as to anchor, embed, or fasten them in the surrounding light-duty concrete material.

The particular spreading body can be a sphere which is initially positioned at or in the tail end, i.e. the end opposite the head end of the wall plug anchor assembly. This sphere has a diameter which is greater than the inner diameter of the sleeve body.

The spreading or flaring in this prior art wall plug anchor assembly is achieved by forcing the sphere through the tail end, for flaring or spreading of the legs formed in the longitudinally slotted portion, and the legs are anchored accordingly.

However, this anchoring system does not apply in the case where a bore hole is first drilled into the particular construction component or structure, as is done in the case of heavy-duty type concrete and like compositions.

In a further embodiment of the prior-art wall plug anchor assembly of German patent publication No. 36 03 134, the sphere which serves as the spreading body, or a conical wedge, is formed with interior or female screw-threads which cooperate with exterior screw-threads of a bolt. The bolt, in turn, has a head end which can abut against the head of the sleeve.

Upon tightening of the bolt, the spreading body, sphere, or conical body, can be forced into the slotted section of the sleeve for flaring and anchoring of the legs which remain between the slots.

One might assume that the anchoring system or assembly according to German patent publication No. 36 03 134 can be equally utilized in applications in which a bore hole is preformed in the concrete material, since the legs might be flared or spread for anchoring, upon tightening or turning of the respective bolt to move the particular spreading body that is being used.

However, it has been found that such a prior-art wall plug anchor assembly can only be successfully used with gas-expanded or light-duty concrete and the like material, so that the flaring or spreading of the legs can be attained to yield satisfactory retention and safety values or margins.

Furthermore, in the prior-art wall plug anchor assembly it is a requirement that the bolt cooperating with the spreading body, i.e. the sphere or the spreading cone in its place, also be the actual securing element by means of which other construction members can be secured by the wall plug anchor assembly to the concrete body or structure, for example a wall. If a securing element other than the bolt is used in the wall plug anchor assembly, it would remove the spreading body from its frictional engagement in the sleeve, namely the flared section thereof, and its flaring might be reversed upon application of pulling (tensile) forces, thereby eliminating the anchoring action of the sleeve.

OBJECTS OF THE INVENTION

It is, therefore, the principal object of the present invention to provide an anchor or wall plug anchor assembly of the type briefly described in the foregoing which precludes the disadvantages and problems of the prior art.

It is also an object of the invention to provide a fastener or anchor which achieves optimum retention in the surrounding material, especially in heavy-duty concrete environments.

It is also an object of the invention to provide a wall plug anchor assembly which is of simple yet effective design.

It is further an object of the present invention to provide a wall plug anchor assembly which can be positively secured in a pre-drilled bore hole.

SUMMARY OF THE INVENTION

The foregoing and other objects and advantages of the invention are obtained by a wall plug anchor assembly of the type described, in the sleeve of which are arranged: (a) a wedge element having a wedge surface or plane which is inclined at an acute angle with respect to the longitudinal axis of the sleeve, and (b) a spreading body associated with the wedge surface of the wedge element.

The wedge element provides a positive or thrust-type bearing or support (anvil) for the spreading body.

A rod-like driver can be introduced from the crown end of the sleeve and can then be advanced through the sleeve to be applied against the spreading body.

When exterior, axially directed forces are applied to the driver, the spreading body can be displaced laterally along the wedge surface of the wedge element, from its initial coincidental position with the longitudinal central axis of the sleeve, into closer proximity with the interior sleeve walls, and under plastic deformation, the spreading body can be anchored between the walls of the sleeve and the wedge element.

This wall plug anchor assembly achieves an effective anchoring in the solid concrete materials of walls and the like structures, especially those made of heavy-duty or reinforced concrete and the like, with retention forces of up to 10,000 (1000 kp) being attainable.

It is also advantageous for the anchoring effect that the plastic deformation of the wall plug anchor assembly takes place at a considerable distance from the crown end or portion of the wall plug anchor assembly with concomitant problem-free, optimal penetration of securing elements, such as screws and the like fasteners, being assured in the tubular wall plug anchor assembly.

It is further advantageous that the rod-like driver is a shaft or bolt of hardened steel and that it has an end adapted to contact the spreading body with a driving plane which extends substantially transversely with respect to the central or longitudinal axis of the driver and the sleeve, respectively.

This assembly assures a positive driving-in of the spreading body along the respective wedge surface or incline into the material of the sleeve.

It is also of advantage that the driving plane at the end of the driver includes a conical portion having a conicity or inclination-direction which is substantially identical to that of the wedge surface at the wedge element.

The driver can be readily moved a predetermined distance along the incline or wedge surface of the wedge element, to ensure a rather deep driving-in of the spreading body into the sleeve wall, and a substantial widening of the cross-sectional dimension of the sleeve at he deformation which is produced at the respective location.

It is furthermore of advantage to provide a tubular wall plug anchor assembly having a spreading body which is a sphere, preferably a hardened steel sphere.

It is advantageous as well, that the wedge surface extends substantially over the full length of the wedge element. This means that rather light hammer strokes are sufficient to achieve, by means of the spreading body, e.g. a sphere, a rather massive plastic deformation of the sleeve of the wall plug anchor assembly.

It can also be advantageous that the spreading body has at least the approximate configuration or shape of the wedge element.

The wedge element and the spreading body can respectively include a cylindrical part or guide section, with the respective diameter of the guide section allowing a predetermined amount of play or clearance in the clear width, or lumen or caliber of the sleeve.

In the most general application, only one wedge surface is provided at the wedge element and the spreading body, respective and, preferably, this surface extends fully over the cross section of the respective member.

It is, however, also advantageous that at least that wedge element or body which serves as the spreading body has several wedge surfaces, for example four, which are evenly distributed about its circumference. These form a common tip which at least approximately coincides with the longitudinal axis of the cylindrical guide section.

For provision of a ready-for-use assembly, the wedge members or elements and spreading bodies can be fixed in their initial position with respect to one another and with respect to the sleeve by means of an adhesive.

When the driver is applied, upon insertion or mounting of the wall plug anchor assembly sleeve in the pre-drilled bore hole, and the crown of the driver is subjected to hammer strokes, the initial or starting position of the adhesively-joined elements is changed. Thus, the spreading body and the wedge element are displaced within the sleeve and with respect to one another and a plastic deformation or deformation of the sleeve in the longitudinal and the transverse or cross-sectional directions is attained.

In a particularly effective wall plug anchor assembly, the wedge element is also made of a plastically deformable metal, especially steel of German steel quality ST 34 and ST 37. Such a materials selection can give rise to sufficient heat energy by the forces imparted upon and by the driver, this being subjected to hammer strokes on the crown end, that a beneficial fusion or heat-welding arises at the contacting surfaces of the wedge element and the spreading body.

A very positive seating of the wall plug anchor assembly in the bore hole is attained when the depth or length of the pre-drilled bore hole is slightly greater than the effective or overall length of the wall plug anchor assembly. This will allow that the lower, i.e. the end which is opposite to the crown portion of the sleeve, of the wedge element provides a support surface which acts as thrust-bearing or like support means which can be placed at the bottom of the bore hole.

The anchoring effect of the wall plug anchor assembly can also be enhanced by a sleeve which is formed with slots, but leaving legs or like formations over a short section, e.g. for a distance of 10 mm. These will allow spreading of the sleeve at the foot end thereof.

In some applications it need not be necessary to support the sleeve—but which has been widened by plastic deformation in axial and radial directions—and provided with spread leg portions as required—and it can be sufficient that the function of the spreading body is exclusively provided by the driver, i.e. a separate spreading body need not be supplied. In other words, the spreading body is unitarily formed with the driver.

For attainment of an optimum anchoring, it is also particularly advantageous that the ratio of the wall thickness of the sleeve to its outer diameter is approximately in the range of 0.1:1 and 0.125:1.

BRIEF DESCRIPTION OF THE DRAWING

The above and other objects, features and advantages will become apparent from the following description, reference being made to the accompanying drawing in which:

FIG. 4 is a side elevation of the four components of a second wall plug anchor assembly according to the invention;

FIG. 5 is a longitudinal cross-sectional representation of the wall plug anchor assembly according to FIG. 4 in a bore hole in the respective concrete environment just prior to its anchoring;

FIG. 6 is a view similar to FIG. 5 showing the wall plug anchor assembly in the bore hole just prior to completion of the anchoring phase;

FIG 7 shows a modified spreading body with four wedge surfaces, in side elevation, as well as from the end to show the respective tip;

FIG. 7A is an end view of the body of FIG. 7;

FIG. 8 shows a modified spreading body with four wedge surfaces, in side elevation, as well as from the end to show the respective tip; and FIG. 8A is an end view of the latter embodiment.

SPECIFIC DESCRIPTION

Figure 1:
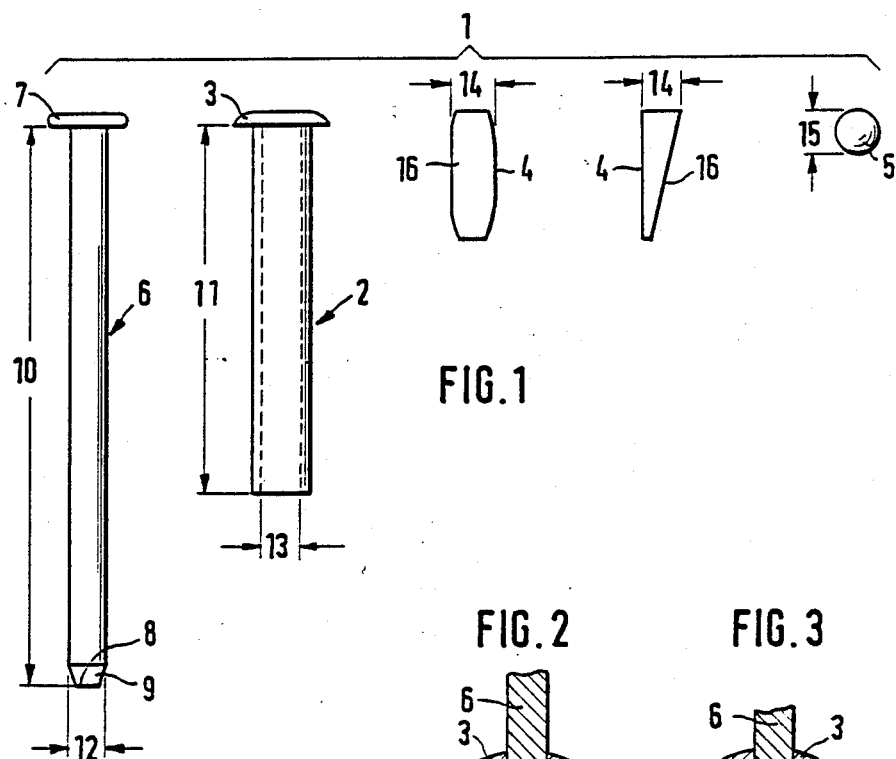
FIG 1 is a side elevational view of the four components of a first wall plug anchor assembly according to the invention.

FIG. 1 shows the basic components of a tubular wall plug anchor assembly 1. Wall plug anchor assembly 1 is particularly intended to be mounted in a pre-drilled bore hole in concrete formations such as of a wall or construction element or component of heavy-duty or reinforced concrete or a like composition.

Wall plug anchor assembly 1 is comprised of a cylindrical sleeve 2 with a unitary head portion 3 which is made by rolling-over. The material of construction for the sleeve 2 is preferably a steel having good plastic deformability, for example stainless steel, and including steels of German steel quality ST 34 or ST 37.

Wall plug anchor assembly 1 also includes an anvil-type wedge element 4 as can best be seen in FIG. 1, in which are given a front view showing particularly the wedge surface 16, and an associated side view.

FIG. 1 also shows a spreading body, namely a sphere 5 made of a distortion-resistant material such as hardened steel.

For anchoring of the tubular wall plug anchor assembly 1 in a bore hole of a construction component or formation, a rod-like driver 6 is utilized. As indicated in FIG. 1, this has generally the shape of a nail. The driver 6 is also made of a hardened steel, or the like material.

The crown or head end of the driver 6 comprises an annular or flange-type formation 7 which is formed by a punching operation. The tail or foot end of the driver 6 comprises a riving surface 8 which extends substantially perpendicularly with respect to the central longitudinal axis of the driver 6. The driving surface 8 is part of the conical portion 9 at the foot end of driver 6.

The overall or effective length 10 of the shaft portion of driver 6 is at least equal to the overall or effective length 11 of the sleeve 2.

It is within the scope of the invention that the longitudinal extent (length 10) of the shaft portion of driver 6 is greater by one-third of the longitudinal extent of the effective length 11 of sleeve 2 for wall plug anchor assembly 1.

The shaft portion of the rod-like driver 6 has a diameter 12 which is adapted to the clear or inner diameter 13 of sleeve 2 so as to allow only a small amount of radial clearance or play.

The diameter of the wedge element 4 is indicated by reference numeral 14, and the diameter of the spreading body or sphere 5 for this sleeve 2 is indicated by reference numeral 15. The diameters of both these elements fit tightly, i.e. with only a small amount of radial clearance, in the inner diameter 13 of the sleeve 2.

The wedge element 4 is equipped with the wedge surface or drive plane 16 with an inclination or slope which extends under an acute angle to the longitudinal axis or base of the wedge element 4.

It is preferred that the wedge element 4 and the associated spreading body, namely sphere 5, are fixedly arranged in a predetermined basic arrangement with respect to one another and the sleeve 2 of the wall plug anchor assembly 1.

Figure 2:
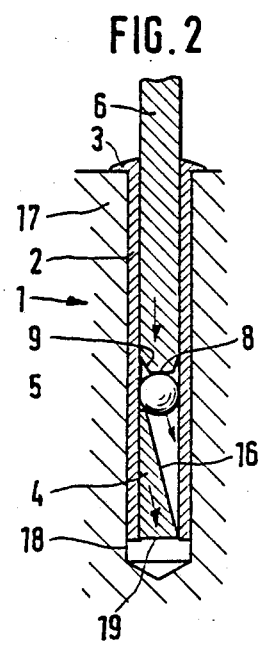
FIG. 2 is a longitudinal cross-sectional representation of the wall plug anchor assembly in a bore hole in the respective concrete environment just prior to the anchoring.

This basic or initial disposition of the mentioned elements is indicated in FIG. 2. At the outset, the respective connection is maintained by means of an adhesive (not shown in detail but known in the art) which secures the wedge element 4 and the sphere 5 with respect to one another and with respect to the sleeve 2.

For mounting of the wall plug anchor assembly 1, as the first step a bore hole 18 is produced in the construction component or body 17, and the diameter of this bore hole is a function of the outer diameter of sleeve 2 of wall plug anchor assembly 1. The length of depth of the bore hole 18 is selected in such a way that it is only slightly greater than the effective or overall length 11 of the sleeve 2, as is indicated in FIG. 2.

Once the bore hole 18 has been produced, the wall plug anchor assembly 1 is inserted until the head end or crown 3 of the sleeve 2 is in abutting relationship with the face of the construction component 17.

Next, the rod-like driver 6 is slid into the sleeve 2, by being introduced through the open end or mouth, until the driving surface 8 contacts the spreading body or sphere 5, as is shown in FIG. 2.

By way of axially directed forces, for example hammer strokes the like percussive or impacting forces, which can be imparted to the head end of the driver 6, the adhesive connection between the sleeve 2 and the sphere 5 is severed. The sphere 5 can then be further advanced through the sleeve 2 and can contact the wedge surface or plane 16 of the wedge element 4.

The wedge element 4, in turn, serves to provide a positive support or thrust-type bearing for the spreading body or sphere 5. For this, one needs to sever the adhesive connection or bond between the wedge element 4 and the sleeve 2 so that the end 19 of the wedge element 4 which is remote from the sphere-engaging end or terminus can be seated upon or at the base of the drill hole 18 and can serve as a thrust-bearing or like support.

This arises due to the mentioned, axially-directed impact forces which, accordingly, serve to break or sever the bond between the wedge element 4 and the sleeve 2 to allow the respective advance of the wedge element 4 until the support or thrust surface 19 of the wedge element 4 is seated at the base of the drill hole 18. The wedge element 4 is then fixed in position and serves to provide an anvil-type or thrust-bearing means.

Figure 3:
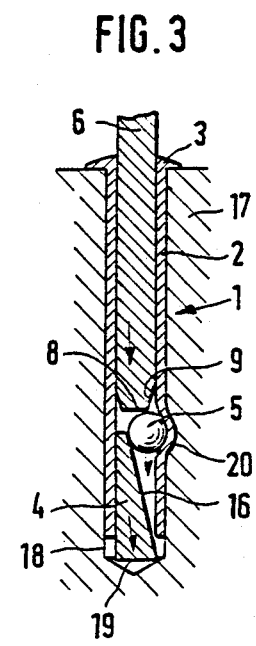
FIG. 3 is a view similar to FIG. 2 showing the wall plug anchor assembly in the bore hole just prior to completion of the anchoring phase.

The sphere 5 can be further moved along the plane or wedge surface 16, due to hammer strokes, with a corresponding displacement from the initial position, in which the center of the sphere 5 is coaxially aligned with the longitudinal central axis of the sleeve 2, into the deflected position in which the sphere 5 is impacting on the wall of the sleeve 2 to such an extent that a plastic deformation, generally of the shape of a bulge, is attained, as is shown in FIG. 3.

The bulge or projecting formation, generally identified by reference numeral 20, achieves a regional increase of the cross-sectional diameter of the sleeve 2 which serves to attain the anchoring of the sleeve in the wall of the drill hole 18 and, accordingly, in the construction component 17.

It is particularly effective for the bulge or plastic deformation 20 to be located at a considerable distance away from the head end 3 of the sleeve 2. This will contribute to a maximum anchoring strength and yield retention values of up to approximately 10 000 N (1000 kp).

The anchoring process and effect of the sleeve 2 in the construction material is facilitated by the movement of the conical section 9 of the rod-like driver 6 along the wedge surface 16 of the wedge element 4. Thus, the sphere 5 is brought into the spreading or bulging action with the surface 8 contacting the sphere 5, and the latter is advanced the desired distance along the wedge surface 16. This ensures a positive and dimensionally stable configuration of the bulge 20 with respect to height and length thereof and in reference to the initial shape of the sleeve 2, with the corresponding anchoring action being optimized in respect to longitudinal and torsional forces.

Upon attainment of the final extent or shape of the bulge 20, the sphere 5 and the wedge element 4 are positively locked in place by a wedging or jamming action to provide a positive anchoring force and also to stabilize the projecting formation 20 of the sleeve 2.

When the tubular wall plug anchor assembly I has been anchored in the bore hole 18 of the construction formation or body 17, the driver 6 can be retracted again from the sleeve 2. The sleeve 2 can then be used to mount therein the actual securing means. This can be, for example, a bolt which can be secured by way a self-tapping screw-threads.

A further embodiment of the invention is shown in FIGS. 4 to 6, and the modifications of this with respect to the embodiment shown in FIGS. 1 to 3 are described in the following.

The wall plug anchor assembly of this embodiment is generally identified by reference numeral 21. The configuration of the sleeve 22 of this wall plug anchor assembly 21 corresponds generally to the configuration of sleeve 2 of wall plug anchor assembly 1.

Thus, it includes a head end 23 which is formed by rolling of the edge to extend it in the shown annular or collar configuration.

The wedge element 24 and the spreading element 25 have distinctions when compared with the previously described corresponding elements, wedge element 4 and spreading body or sphere 5 of FIG. 3.

Thus, the wedge element 24 is a relative short and round or cylindrical member. Wedge element 24 serves as an anvil-type thrust means. Wedge element 24 has a guide section 24a and an inclined or wedge plane 24b.

The spreading element, second wedge element, or wedge body 25 is a somewhat longer cylindrical wedge body with a guide section 25a and an inclined or wedge plane 25b.

As shown in FIGS. 4 to 6, the rod-like driver 26 of this embodiment is substantially identical to the driver 6 of the embodiment described with reference to FIGS. 1 to 3. Its configuration is that of a nail with a head or crown end 27 which is formed by coining to fashion the annular projection or collar. The other end of the driver 26 comprises a driving surface 28 which is part of the conical portion 29 at the foot end of driver 26.

The overall or effective length 30 of the shaft portion of driver 26 is greater than the overall or effective length 31 of the sleeve 22.

The shaft portion of the rod-like driver 26 has a diameter 32 which is adapted to the clear or inner diameter 33 of sleeve 22 so as to allow only a small amount of radial clearance or play.

The diameter of the wedge element 24 is indicated by reference numeral 34, and the diameter of the wedge body 25 is indicated by reference numeral 35. These diameters are selected so as to allow only a small amount of radial clearance in inner diameter 33 of the sleeve 22.

The wedge element 24 according to FIGS. 4 to 6 has a wedge surface or drive plane 24b with an inclination or slope which extends at an acute angle to the longitudinal axis or base of the wedge element 24. However, by contrast with the previously described embodiment, the effective height of the drive plane 24b does not extend over the full length of the wedge element 24, as is the case with the drive plane 16. Thus, wedge element 24 includes the mentioned guide section 24a which cooperates with the interior of sleeve 22.

The shorter wedge body 25 serves as the spreading body. It has a guide section 25a, a wedge surface 25b, and is adapted in complementary manner with respect to the wedge element 24.

The wedge element 24 and the associated wedge body 25 are initially fixedly arranged in a predetermined basic arrangement with respect to one another and the sleeve 22 of the wall plug anchor assembly or wall plug anchor assembly 21.

This basic or initial disposition of the mentioned elements is indicated in FIG. 5. At the outset, the connection is maintained by means of an adhesive (not shown in the drawing, but known in the art) which secures the wedge element 24 and the wedge body 25 with respect to one another and the with respect to the sleeve 22, with the two inclined surfaces 24b and 25b solidly contacting one another, i.e. in a continuous or congruent manner.

For mounting of the wall plug anchor assembly 21 initially a bore hole 38 is produced in the construction component or body 37.

Once the bore hole 38 has been produced, the sleeve 22 of the wall plug anchor assembly 21 is inserted until the head end or crown 23 of the sleeve 22 is in abutting relationship with the face of the construction component 37, as is shown in FIG. 5.

Next, the rod-like driver 26 is slid into the sleeve 22, by being introduced through the open end or mouth, until its driving surface 28 contacts the wedge body 25, as is also shown in FIG. 5.

By way of axially directed forces, for example hammer strokes and the like percussive or impacting forces, which can be imparted on the head end 23 of the driver 26, the adhesive connections between the sleeve 22 and respectively the wedge element 24 and the wedge body 25 are disrupted or severed.

In the subsequent phase, the wedge element 24 and the wedge body 25 are moved, more or less as a unitary body and coaxially with respect to the longitudinal central axis of sleeve 22, through the sleeve 22. This movement continues until the leading end 39 of wedge element 24 has reached the base of the drill hole 38, see FIG. 6.

The wedge element 24 is then fixed in position and serves to provide an anvil-type or thrust-bearing means.

The wedge body 25 can be moved with its wedge surface 25a sliding along the plane or wedge surface 24b, upon further hammer strokes being imparted at the crown end of driver 26.

The wedge body 25 will gradually experience a displacement from the initial position, in which its longitudinal central axis is co-incidentally aligned with the longitudinal central axis of the sleeve 22, into the deflected position in which the tip of the wedge surface 25b is impacting on the wall of the sleeve 22 to such an extent that a plastic deformation, generally of the shape of a bulge, is attained, as is shown with reference numeral 40b in FIG. 6.

An associated deflection is experienced by the wedge element 24 and the tip of the wedge surface 24b causes a lateral bulge or plastic deformation 40a in the wall of sleeve 22.

The projecting formations 40a and 40b, respectively, achieve regional increases of the cross-sectional diameter of the sleeve 22 which serve to attain the anchoring of the sleeve in the wall of the drill hole 38 and, accordingly, in the construction component 37. They contribute to a maximum anchoring strength and yield retention values of up to approximately 10 000 N (1000 kp).

With reference to the embodiment of FIGS. 1 to 3 it has been mentioned that the material of construction of sphere 5 can be hardened steel. With reference to the embodiment of FIGS. 4 to 6, the material of construction of the wedge element 24 and the wedge body 25 can be a more ductile or relative soft material, for example steel of the German steel quality ST 34 and ST 37.

Thus, the anchoring process can be enhanced since the hammering imparted to the driver 26 is transmitted to such an extent to the wedge element 24 and the wedge body that the frictional forces at the contacting surfaces 24b and 25b create sufficient heat to weld or bond the two members and to fix the position thereof with respect to one another and the sleeve 22.

It is also within the scope of this invention to have the driver 26 force the wedge member 24 past the wedge body 25 and to disengage the wedge surfaces 24b and 25b. The cylindrical guide sections 25a and 25b are then arranged in parallel and in contact with each other in transverse, radial direction to provide a positive-locking wall plug anchor assembly or wedging action.

Furthermore, in modification of the embodiments of the wedge members, i.e. wedge element 24 and wedge body 25 shown in FIGS. 4 to 6, at least the wedge or spreading body 25 can be equipped with several, for example four, inclined or wedge surfaces. This is indicated in FIGS. 7 and 7A. Thus, the cylindrical wedge element 44 has a guide portion 44a and four symmetrically arranged wedge surfaces or planes 44b tapering towards a common tip 44c which is positioned coincidentally with the central longitudinal axis of the wedge element 44.

FIGS. 8 and 8A show a modified wedge element 54, corresponding generally in function and structure to wedge element 24. Wedge element 54 has a guide portion 54a and four symmetrically arranged wedge surfaces or planes 54b which taper towards a common tip 54c which is positioned coaxially with the central longitudinal axis of the wedge element 54.

Such pointed wedge bodies can be manufactured in simple and economic manner with equipment and tools as are used in the production of nails.

As well, due to the axially directed forces imparted by the driver 26, the inclined surfaces of such pointed wedge members can achieve a relative bending of the wedge members which enhances the anchoring effect by their positions with respect to each other and the sleeve.

It is also within the scope of this invention that the driver 26 takes the place of the wedge body. For this, the foot end of driver 26 can have a respective wedge surface or plane, not shown in the drawing but corresponding in detail to inclined plane 25b, and co-acting with the wedge member 24 in analogous manner as described in the foregoing.

It is also within the scope of this invention that the sleeves (2 or 22) are slotted, e.g. for a distance of 10 mm from the tail end, to provide anchoring legs which can engage the wall/material of the respective bore hole.

Particularly good operating results have been obtained with sleeves (2 or 22) made of steel, such as German stainless steel qualities ST 34 and ST 37.

The ratio w:d of the respective wall thickness (w) of a sleeve (2 or 22) to the respective outer diameter (d) is advantageously within the range of 0.1:1 and 0.125:1, for example the sleeves (2 or 22) can have a wall thickness (w) of 1 mm and an outer diameter (d) of 10 mm or 8 mm.

We claim:

1. A tubular wall plug anchor assembly which can be anchored in a bore hole in concrete, especially heavy-duty, reinforced concrete and like compositions, comprising in combination:
   a hollow longitudinal sleeve adapted to be arranged in a respective bore hole, said sleeve including a longitudinal body, a head end, and a foot end remote from said head end, said head end having a diameter greater than said body;
   a first wedge member adapted to be disposed within said longitudinal body of said sleeve, said first wedge member including at least one wedge surface which is inclined at an acute angle with reference to the longitudinal axis of said sleeve, and said wedge surface providing a positive support for a respective spreading body;
   a spreading body disposed between said first wedge member and a respective driver;
   a rod-like driver in said sleeve and applied against said spreading body upon exterior axial forces being applied to said driver, wherein said spreading body is adapted to operatively contact said first wedge member for lateral displacement of said spreading body along said wedge surface from a first position in which said spreading body is substantially coaxially aligned with its longitudinal central axis with the longitudinal central axis of said sleeve, into a second position in which said spreading body is in sufficiently close proximity with the interior sleeve wall to effect a plastic deformation thereof for anchoring said wall plug anchor assembly in the respective bore hole, said spreading body being a steel sphere.

2. The wall plug anchor assembly defined in claim 1 wherein said sleeve at its foot end is formed over a predetermined distance with longitudinal slot formations.

3. The wall plug anchor assembly defined in claim 2 wherein the effective length of said slot formation is approximately 10 mm.

4. The wall plug anchor assembly defined in claim 1 wherein the ratio of a wall thickness of said sleeve to its outer diameter thereof is approximately in the range of 0.1:1 and 0.125:1.

5. The wall plug anchor assembly defined in claim 1, wherein said rod-like driver is made of a hardened steel, said driver having a driving plane adapted to contact said spreading body and extending substantially transversely with respect to the longitudinal axis of said driver and said sleeve.

6. The wall plug anchor assembly according claim 1 wherein said wedge surface extends substantially over the full length of said first wedge member.

7. The wall plug anchor assembly defined in claim 1 wherein said first wedge element at its end which is opposite to the head end of said sleeve includes a support surface which can be placed at the bottom of the respective bore hole.

8. A tubular wall plug anchor assembly which can be anchor in a bore hole in concrete, especially heavy-duty, reinforced concrete and like compositions, comprising in combination:
 a hollow longitudinal sleeve adapted to be arranged in a respective bore hole, said sleeve including a longitudinal body, a head end, and a foot end remote from said head end, said head end having a diameter greater than said body;
 a first wedge member adapted to be disposed within said longitudinal body of said sleeve, said first wedge member including at least one wedge surface which is inclined at an acute angle with reference to the longitudinal axis of said sleeve, and said wedge surface providing a positive support for a respective spreading body;
 a spreading body disposed between said first wedge member and a respective driver;
 a rod-like driver in said sleeve and applied against said spreading body upon exterior axial forces being applied to said driver, wherein said spreading body is adapted to operatively contact said first wedge member for lateral displacement of said spreading body along said wedge surface from a first position in which said spreading body is substantially coaxially aligned with its longitudinal central axis with the longitudinal central axis of said sleeve, into a second position in which said spreading body is in sufficiently close proximity with the interior sleeve wall to effect a plastic deformation thereof for anchoring said wall plug anchor assembly in the respective bore hole, said driver including a conical portion having an inclination-direction which is substantially identical to the inclination-direction of said wedge surface of said first wedge member.

9. A tubular wall plug anchor assembly which can be anchor in a bore hole in concrete, especially heavy-duty, reinforced concrete and like compositions, comprising in combination:
 a hollow longitudinal sleeve adapted to be arranged in a respective bore hole, said sleeve including a longitudinal body, a head end, and a foot end remote from said head end, said head end having a diameter greater than said body;
 a first wedge member adapted to be disposed within said longitudinal body of said sleeve, said first wedge member including at least one wedge surface which is inclined at an acute angle with reference to the longitudinal axis of said sleeve, and said wedge surface providing a positive support for a respective spreading body;
 a spreading body disposed between said first wedge member and a respective driver;
 a rod-like driver in said sleeve and applied against said spreading body upon exterior axial forces being applied to said driver, wherein said spreading body is adapted to operatively contact said first wedge member for lateral displacement of said spreading body along said wedge surface from a first position in which said spreading body is substantially coaxially aligned with its longitudinal central axis with the longitudinal central axis of said sleeve, into a second position in which said spreading body is in sufficiently close proximity with the interior sleeve wall to effect a plastic deformation thereof for anchoring said wall plug anchor assembly in the respective bore hole, said spreading body being a second wedge member having at least one wedge surface, at least one of said wedge members including a cylindrical guide section having a diameter which fits with a predetermined amount of play in the caliber of said sleeve.

10. A tubular wall plug anchor assembly which can be anchor in a bore hole in concrete, especially heavy-duty, reinforced concrete and like compositions, comprising in combination:
 a hollow longitudinal sleeve adapted to be arranged in a respective bore hole, said sleeve including a longitudinal body, a head end, and a foot end remote from said head end, said head end having a diameter greater than said body;
 a first wedge member adapted to be disposed within said longitudinal body of said sleeve, said first wedge member including at least one wedge surface which is inclined at an acute angle with reference to the longitudinal axis of said sleeve, and said wedge surface providing a positive support for a respective spreading body;
 a spreading body disposed between said first wedge member and a respective driver;
 a rod-like driver in said sleeve and applied against said spreading body upon exterior axial forces being applied to said driver, wherein said spreading body is adapted to operatively contact said first wedge member for lateral displacement of said spreading body along said wedge surface from a first position in which said spreading body is substantially coaxially aligned with its longitudinal central axis with the longitudinal central axis of said sleeve, into a second position in which said spreading body is in sufficiently close proximity with the interior sleeve wall to effect a plastic deformation thereof for anchoring said wall plug anchor assembly in the respective bore hole, said spreading body being a second wedge member having at least one wedge surface, at least said second wedge member having a plurality of inclined edge surfaces distributed about its circumference and which form a common tip which at least approximately coincides with the longitudinal axis of said second wedge member.

11. A tubular wall plug anchor assembly which can be anchor in a bore hole in concrete, especially heavy-duty, reinforced concrete and like compositions, comprising in combination:
- a hollow longitudinal sleeve adapted to be arranged in a respective bore hole, said sleeve including a longitudinal body, a head end, and a foot end remote from said head end, said head end having a diameter greater than said body;
- a first wedge member adapted to be disposed within said longitudinal body of said sleeve, said first wedge member including at least one wedge surface which is inclined at an acute angle with reference to the longitudinal axis of said sleeve, and said wedge surface providing a positive support for a respective spreading body;
- a spreading body disposed between said first wedge member and a respective driver;
- a rod-like driver in said sleeve and applied against said spreading body upon exterior axial forces being applied to said driver, wherein said spreading body is adapted to operatively contact said first wedge member for lateral displacement of said spreading body along said wedge surface from a first position in which said spreading body is substantially coaxially aligned with its longitudinal central axis with the longitudinal central axis of said sleeve, into a second position in which said spreading body is in sufficiently close proximity with the interior sleeve wall to effect a plastic deformation thereof for anchoring said wall plug anchor assembly in the respective bore hole, said spreading body being a second wedge member having at least one wedge surface, said first and second member and said sleeve in their base position with respect to one another being fixed in position by means of an adhesive.

* * * * *